(12) United States Patent
Adachi et al.

(10) Patent No.: US 9,160,883 B2
(45) Date of Patent: Oct. 13, 2015

(54) IMAGE READING APPARATUS WHICH GENERATES AN IMAGE BY SELECTING ONE OF A PLURALITY OF IMAGE DATA OF A FIRST AREA AND A SECOND AREA

(75) Inventors: Toyoshi Adachi, Nagoya (JP); Naoki Nishikawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 32 days.

(21) Appl. No.: 13/354,226

(22) Filed: Jan. 19, 2012

(65) Prior Publication Data

US 2012/0194846 A1 Aug. 2, 2012

(30) Foreign Application Priority Data

Jan. 31, 2011 (JP) .................................. 2011-017768

(51) Int. Cl.
*G06K 15/00* (2006.01)
*H04N 1/387* (2006.01)

(52) U.S. Cl.
CPC ..................................... *H04N 1/387* (2013.01)

(58) Field of Classification Search
USPC ........ 358/1.18, 527, 528, 537, 538, 448–453; 382/282, 284, 286, 293–299, 309; 345/625
See application file for complete search history.

(56) References Cited

U.S. PATENT DOCUMENTS

| | | | | |
|---|---|---|---|---|
| 4,962,464 A | * | 10/1990 | Henzi et al. | 358/1.3 |
| 5,377,013 A | * | 12/1994 | Oka et al. | 358/501 |
| 7,733,548 B2 | * | 6/2010 | Makino et al. | 358/520 |
| 2003/0007196 A1 | * | 1/2003 | Ishimaru et al. | 358/486 |
| 2009/0074462 A1 | * | 3/2009 | Yamazaki | 399/168 |
| 2010/0033769 A1 | * | 2/2010 | Shinkawa | 358/474 |
| 2010/0202026 A1 | * | 8/2010 | Chiu et al. | 358/488 |

FOREIGN PATENT DOCUMENTS

| | | | |
|---|---|---|---|
| JP | S63-004768 A | | 1/1988 |
| JP | H09-294194 A | | 11/1997 |
| JP | H10-097157 A | | 4/1998 |
| JP | 2003-152961 A | | 5/2003 |
| JP | 2003-274066 A | | 9/2003 |
| JP | 2003274066 A | * | 9/2003 |
| JP | 2005-269095 A | | 9/2005 |
| JP | 2005269095 A | * | 9/2005 |
| JP | 2009-290904 A | | 12/2009 |

OTHER PUBLICATIONS

Japan Patent Office, Notification of Reason for Refusal for Japanese Patent Application No. 2011-017768 (counterpart Japanese patent application), dispatched Feb. 12, 2013.

* cited by examiner

*Primary Examiner* — Vincent Rudolph
*Assistant Examiner* — Richa Mishra
(74) *Attorney, Agent, or Firm* — Merchant & Gould PC (57) ABSTRACT

An image reading system and an image reading apparatus are provided. The system or apparatus includes a reading unit configured to read a still original, a selecting unit configured to select one of a plurality of image data of a first area acquired by reading the first area a plurality of times, the first area being a partial area of the original, and a generating unit configured to generate a file storing a first image data which is the image data of the first area selected by the selecting unit, and a second image data which is image data acquired by reading a second area of the original different from the first area by the reading unit.

3 Claims, 9 Drawing Sheets

UPSTREAM ←——— SUB-SCAN DIRECTION ———→ DOWNSTREAM

IMAGE READING APPARATUS WHICH GENERATES AN IMAGE BY SELECTING ONE OF A PLURALITY OF IMAGE DATA OF A FIRST AREA AND A SECOND AREA

CROSS-REFERENCE TO RELATED APPLICATION

This application claims priority from Japanese Patent Application No. 2011-017768, filed on Jan. 31, 2011, the entire subject matter of which is incorporated herein by reference.

TECHNICAL FIELD

Aspects of the present invention relate to an image reading system and an image reading apparatus for reading a still original, and particularly, to an image reading apparatus and an image reading system for generating a file which stores image data of a read original.

BACKGROUND

Recently, there have been widely used portable information terminal devices having touch panels. Since some portable information terminal devices allow browsing of electronic books, there is a need to computerize bound books. For this reason, some image reading apparatuses has a function of reading a bound original such as a book in a two-page spread state. Those image reading apparatuses read two facing pages of an original at once, and stores image data of the read original in an electronic file.

For example, JP2005-269095A describes an image reading apparatuses for reading an original in a two-page spread state (a two-page spread original). The image reading apparatus employs a technique of separately performing image correction on a right page image and a left page image.

SUMMARY

However, the related-art image reading apparatuses has the following problem. That is, a user may change force pressing an original or shifts the original while the original is being read, which would cause misalignment. In this case, the read image becomes a defective image, and thus it is necessary to read the original again from start. However, some defective image may be defective only in a portion thereof, such that a satisfactory image is obtained for the remaining portion. For this reason, it is inefficient not to use such satisfactory image.

Accordingly, an aspect of the present invention provides an image reading apparatus and an image reading system which can efficiently read images.

According to an illustrative embodiment of the present invention, there is provided an image reading system comprising: a reading unit configured to read a still original; a selecting unit configured to select one of a plurality of image data of a first area acquired by reading the first area a plurality of times, the first area being a partial area of the original; and a generating unit configured to generate a file storing a first image data which is the image data of the first area selected by the selecting unit, and a second image data which is image data acquired by reading a second area of the original different from the first area by the reading unit.

According to another illustrative embodiment of the present invention, there is provided an image reading apparatus comprising: a reading unit configured to read a still original; a selecting unit configured to select one of a plurality of image data of a first area acquired by reading the first area a plurality of times, the first area being a partial area of the original; and a generating unit configured to generate a file storing a first image data which is the image data of the first area selected by the selecting unit, and a second image data which is image data acquired by reading a second area of the original different from the first area by the reading unit.

According to a further illustrative embodiment of the present invention, there is provided an image reading apparatus comprising: a reading unit configured to read a two-page spread original having a binding portion; a separating unit configured to separate image data of the two-page spread original read by the reading unit into a first area which is an area of one page and a second area which is an area of the other page, by using the binding portion as a boundary; a selecting unit configured to select one of a plurality of image data of the first area acquired by reading the first area a plurality of times; and a generating unit configured to generate a file storing a first image data which is the image data of the first area selected by the selecting unit, and a second image data which is image data acquired by reading the second area by the reading unit.

According to the above configuration, the image reading apparatus and an image reading system can efficiently read images.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, an image reading apparatus according to an illustrative embodiment of the present invention will be described in detail with reference to the accompanying drawings. In this illustrative embodiment, a multi-function peripheral (MFP) having a scanning function, a printing function, and a file outputting function is applied with an inventive concept of the present invention.

[Configuration of MFP]

Figure 1:
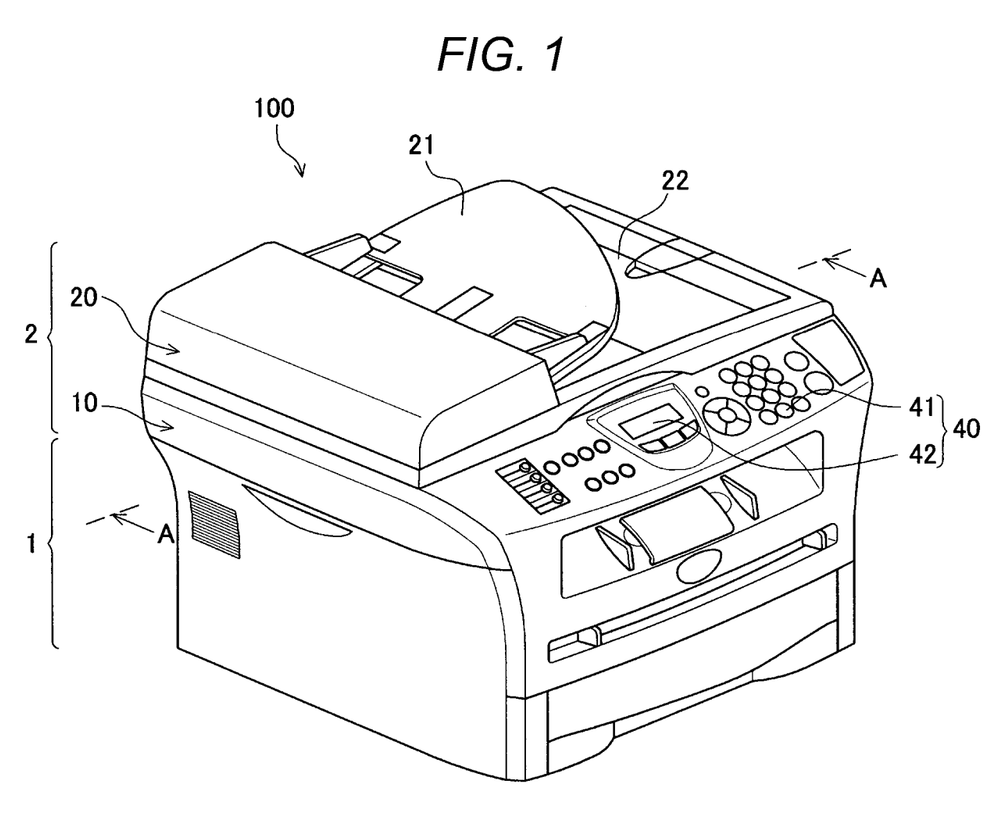
FIG. 1 is a perspective view illustrating an outer appearance of a multi-function peripheral (MFP) according to an illustrative embodiment.

As shown in FIG. 1, an MFP 100 according to the illustrative embodiment includes an image forming unit 1 which prints images on sheets and an image reading unit 2 (an example of a reading unit) which reads images of an original. An image forming system of the image forming unit 1 may be an electro-photographic system or an ink-jet system. Also, the image forming unit 1 may have a color-image forming function, or may be for only monochrome images.

Further, the MFP 100 includes an operation panel 40 on the front side. The operation panel 40 includes a button group 41 including various buttons (for example, a start key, a stop key, and individual buttons of a numeric keypad), and a display unit 42 that is configured by a liquid crystal display. The button group 41 and the display unit 42 enable display of an operation status and allow a user to perform input operation.

[Configuration of Image Reading Unit]

Figure 2:
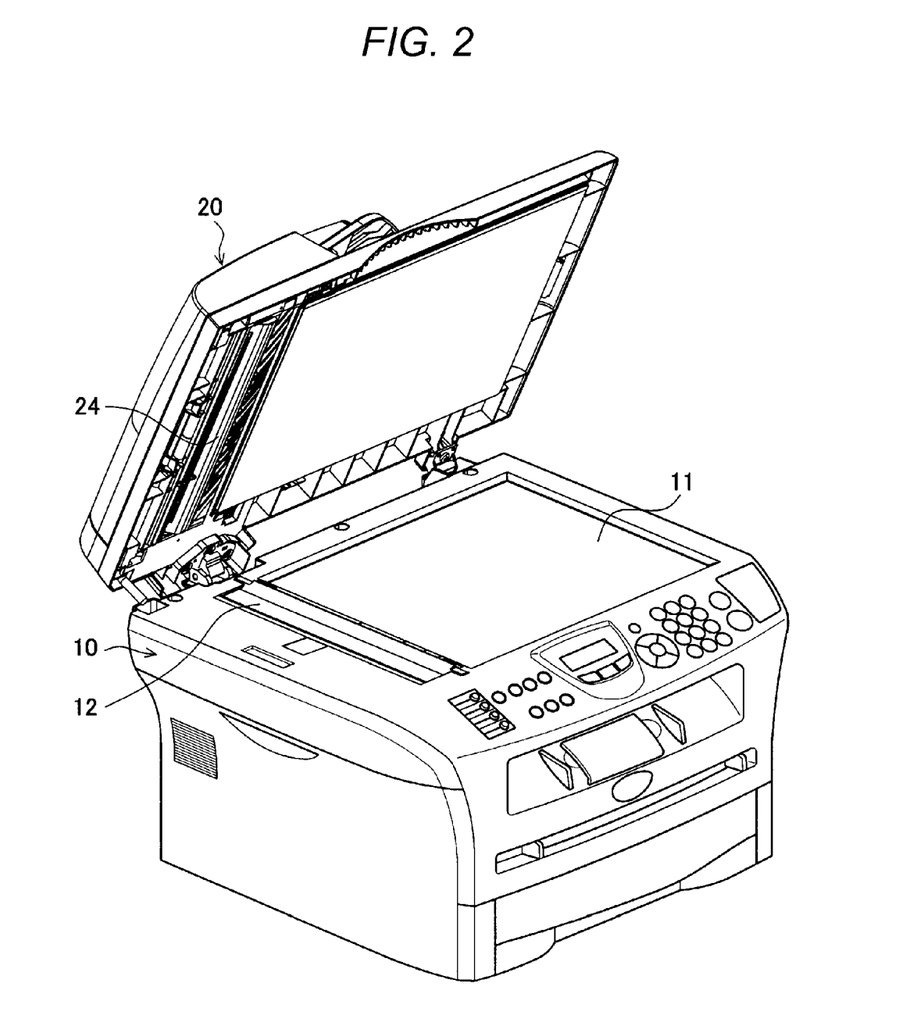
FIG. 2 is a perspective view illustrating the MFP shown in FIG. 1 when an automatic document feeder (ADF) is open.
Figure 3:
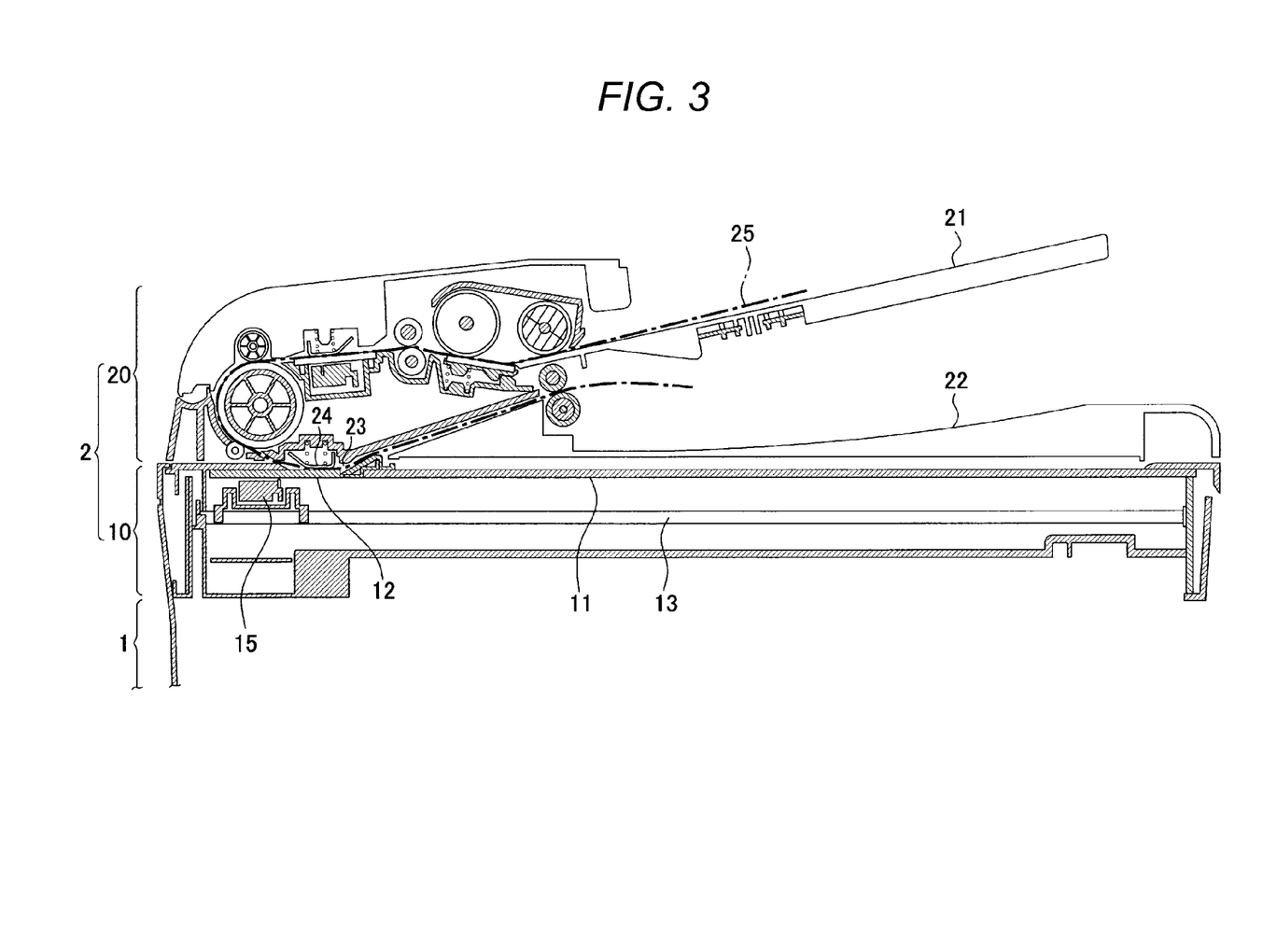
FIG. 3 is a cross-sectional view illustrating an internal configuration of an image reading unit of the MFP shown in FIG. 1 as taken along line A-A of FIG. 1.

Next, a configuration of the image reading unit 2 will be described with reference to FIGS. 1 to 3. FIGS. 1 and 2 show an outer appearance of the image reading unit 2, and FIG. 3 shows an internal configuration of the image reading unit 2.

The image reading unit 2 includes a main body unit 10 which reads images, and an automatic document feeder (ADF) 20 which automatically transfers an original. The ADF 20 is positioned above the main body unit 10, and has one side connected to the main body unit 10 so as to be rotatable with respect to the main body unit 10. Therefore, in the image reading unit 2, an upper surface of the main body unit 10 is openable and closeable by the ADF 20 (see FIG. 2). In other words, the ADF 20 functions as a cover for covering the upper surface of the main body unit 10.

The main body unit 10 includes contact glasses 11 and 12 provided on the upper surface. Further, inside the main body unit 10, an image sensor 15 which reads images of an original is provided below the contact glasses 11 and 12. The image sensor 15 includes optical elements arranged in line in a main scan direction (a depth direction of FIG. 3), and converts reflected light from an original into an electrical signal and outputs the electrical signal. As the image sensor 15, for example, a contact image sensor (CIS) and a charge coupled device (CCD) can be applied.

The image sensor 15 is supported to be slidable with respect to a slide shaft 13. The slide shaft 13 extends in a sub-scan direction (the left-right direction of FIG. 3) and has two end portions fixed to a housing of the main body unit 10. Therefore, the image sensor 15 is provided to be movable in the left-right direction of FIG. 3.

The ADF 20 includes an original tray 21 which holds an unread original, and a discharge tray 22 which holds a read original. Specifically, the original tray 21 is disposed above the discharge tray 22. Further, inside the ADF 20, a substantially U-shaped transfer path 25 that connects the original tray 21 and the discharge tray 22 is provided as an original transfer path. Furthermore, a lower surface of the ADF 20 is formed with an opening 23 such that an original pressing plate 24 is exposed from the opening 23. The original pressing plate 24 faces the contact glass 12 in a state where the ADF 20 is closed.

The ADF 20 picks up an original put on the original tray 21 one sheet by one sheet, and transfers the original to a position facing the contact glass 12 (hereinafter, referred to as ADF glass 12) of the main body unit 10. Specifically, the original passes between the original pressing plate 24 and the contact glass 12. Then, the original is discharged onto the discharge tray 22.

As an original reading system using the image sensor 15, there are a flat bed (fixed-original scanning) system and an ADF (moving-original scanning) system. In a case of the flat bed system, an original is put (placed) on the contact glass 11 (hereinafter, referred to as FB glass 11; an example of a placing table). In this state, while the image sensor 15 moves in the sub-scan direction, an image of the original is read in the main scan direction one line by one line. Meanwhile, in a case of the ADF system, plural originals are put together on the original tray 21. Then, the image sensor 15 moves to the position facing the ADF glass 12 and is fixed at the position. In this state, the ADF 20 transfers each page of the original to a position that is below the original pressing plate 24 and faces the ADF glass 12, and then, an image of the original is read in the main scan direction one line by one line.

For example, in a case of reading a bound original such as a book, the ADF 20 is opened as shown in FIG. 2, the original is made a two-page spread state, and the two-page spread original is set on the FB glass 11 with a surface to be read being downward. Then, in a state where the user presses the original while the ADF 20 is open, the image sensor 15 moves in the sub-scan direction so as to read the original.

[Electrical Configuration of MFP]

Figure 4:
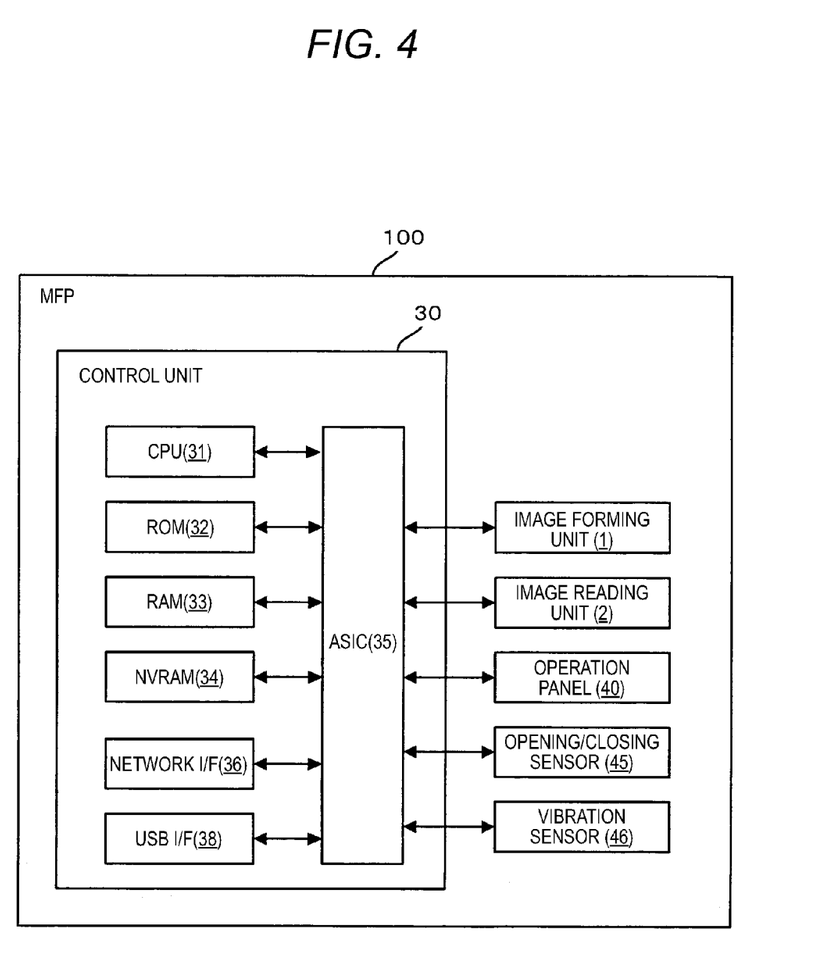
FIG. 4 is a block diagram illustrating an electrical configuration of the MFP shown in FIG. 1.

Next, an electrical configuration of the MFP 100 will be described. As shown in FIG. 4, the MFP 100 includes a control unit 30. The control unit 30 includes a CPU 31, a ROM 32, a RAM 33, a non-volatile RAM (NVRAM) 34, an ASIC 35, a network interface 36, and a USB interface 38.

The ROM 32 stores various control programs for controlling the MFP 100, image processing programs, various settings, initial values, and so on. The RAM 33 is used as a work area into which various control programs are read, or as a storage area for temporarily storing image data of an original read by the image reading unit 2 or image data transmitted through the network interface 36. The NVRAM 34 is a non-volatile storage means, and is used as a storage area for storing various settings, image data, and so on.

The ASIC 35 is electrically connected to the image forming unit 1, the image reading unit 2, the operation panel 40, an opening/closing sensor 45 for sensing opening of the ADF 20, a vibration sensor 46 for sensing vibration of the image reading unit 2 and so on. For example, the ASIC 35 acquires a signal of image data from the image reading unit 2. Further, the ASIC 35 outputs a signal for generating a desired image to the image forming unit 1. Furthermore, the ASIC 35 receives a signal of various buttons input to the button group 41. Moreover, the ASIC 35 outputs a signal of contents to be displayed in the display unit 42.

The CPU 31 (an example of a selecting unit, generating unit, determining unit, a receiving unit, a division display unit, a specifying unit, an acquiring unit, or a prohibiting unit) performs operations for implementing various functions, such as an image reading function, an image forming function, and a file generating function, in the MFP 100, and serves as the center of control. The CPU 31 stores process results in the RAM 33 or the NVRAM 34 in accordance with control programs read from the ROM 32, and controls each component of the MFP 100 through the ASIC 35. Further, the CPU 31 processes image data of an original read by the image reading unit 2, for example, in accordance with programs read from the ROM 32.

The network interface 36 is connected to a network, and the MFP 100 can perform data communication with other information processing apparatuses (not shown) through the network interface 36. The USB interface 38 is connected to a peripheral (not shown) capable of USB connection, and the MFP 100 can perform data communication with an external peripheral, or the like through the USB interface 38.

[Book Scan Mode]

Next, a book scan mode of the MFP 100 will be described. The book scan mode is a mode of reading a bound original such as a book in a two-page spread state, and generating an electronic file storing image data of the read original.

In the book scan mode, an original in a two-page spread state (two-page spread original) is read by the flat bed system. Specifically, if the MFP 100 is set in the book scan mode by the user, a two-page spread original is set on the FB glass 11, and the start key of the button group 41 is pushed, the two-page spread original is read by the image reading unit 2.

After the two-page spread original is read, whether to continue reading is asked to the user. If it is selected to continue reading, the MFP 100 stands by until the user turns to the next page, sets the two-page spread original on the FB glass 11, and inputs a read start instruction. Then, if a read start instruction is input, the newly set two-page spread original is read. Meanwhile, if it is selected to stop reading, the MFP 100 generates a file in a format (for example, a PDF file) capable of storing data of a plurality of images, based on image data of one or more images having been read until the selection of stop.

When storing image data of a two-page spread original, the MFP 100 divides the image data into a left page and a right page. Then, the MFP 100 stores the image data of two pages in a file.

[Book Scanning Process]

First Illustrative Embodiment

Figure 5:
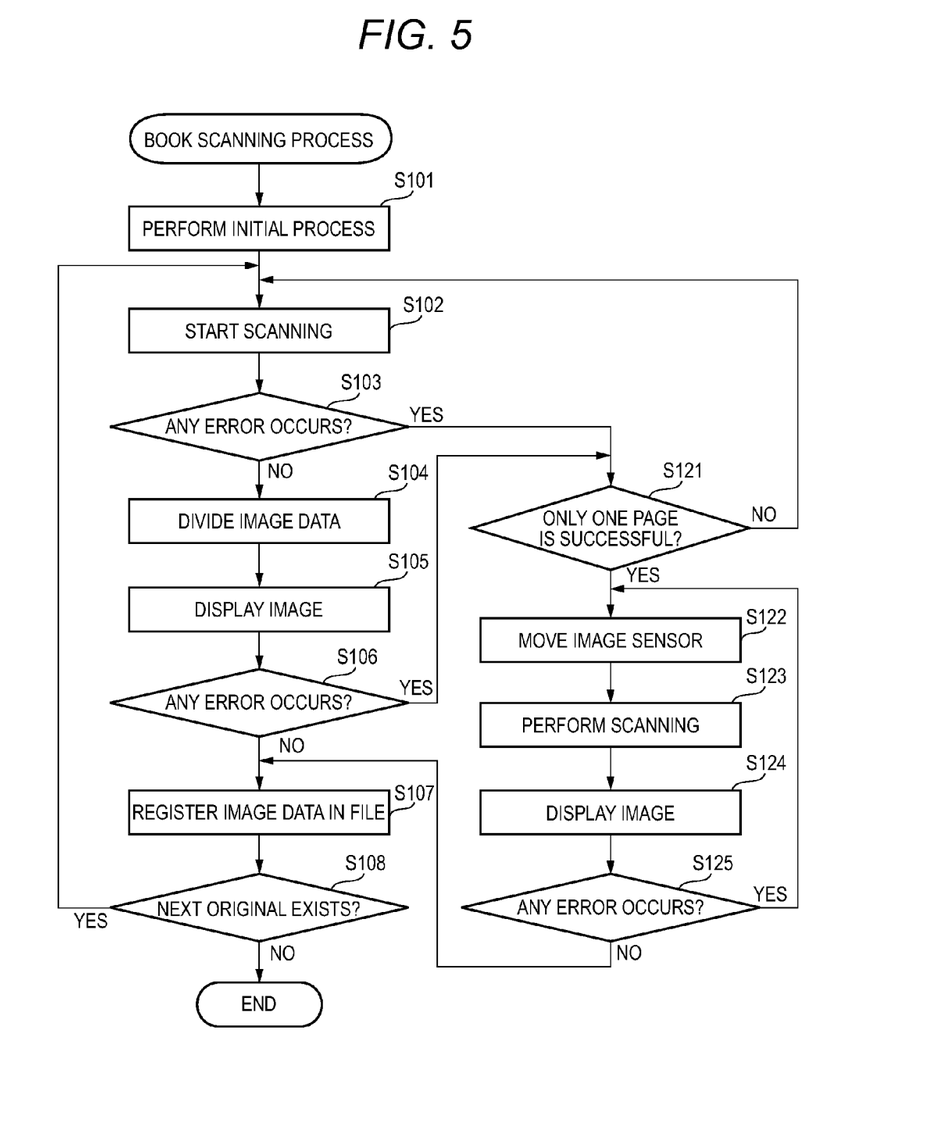
FIG. 5 is a flow chart illustrating a procedure of a book scanning process according to a first illustrative embodiment.

Hereinafter, a procedure of the book scanning process (an example of the selecting unit, the generating unit, the determining unit, the receiving unit, the division display unit, the specifying unit, the acquiring unit, or the prohibiting unit) for implementing an operation in the book scan mode will be described with reference to FIG. 5. If the start key of the button group 41 is pushed in the book scan mode, the book scanning process is performed.

In the book scanning process of the first illustrative embodiment, in S101, an initial process such as acquiring of various initial settings is performed. Example of the initial settings include a setting on whether to erase a binding portion of an original and shadow of a frame from image data after reading, and a setting on whether a two-page spread original which is a read target is a right-opening type or a left-opening type. The initial settings may be set by the user and stored in the NVRAM 43 or the like before the book scanning process starts, or may be set by the user at a timing when S101 is performed. Further, in the initial process, an initial file which has no data registered is generated.

Figure 6:
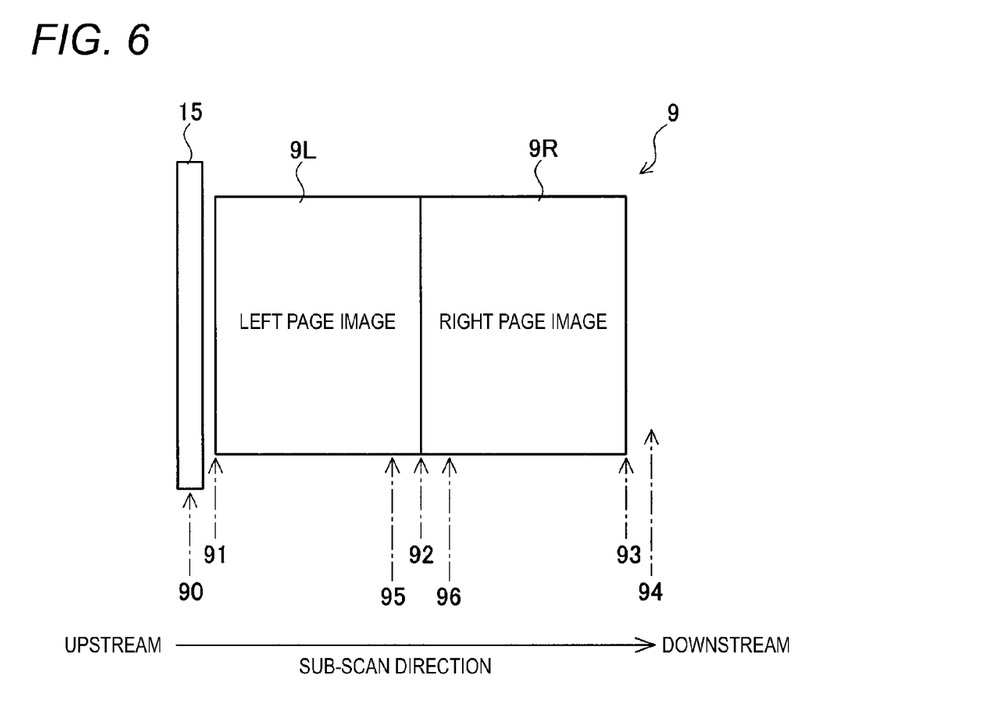
FIG. 6 is a view illustrating a positional relation between an operation of an image sensor and an original.

Further, in S101, the image sensor 15 is moved to an original position. The image sensor 15 is movable in the sub-scan direction along the slide shaft 13, as shown in FIG. 3. As shown in FIG. 6, when there is an original 9 set at a predetermined position on the FB glass 11, an original position 90 of the image sensor 15 is upstream of an upstream edge 91 of the original 9 in the sub-scan direction (an example of a read direction).

Next, in S102, the image sensor 15 starts moving from the original position 90 to the downstream side in the sub-scan direction, so as to read the original set on the FB glass 11. The image data of the read original is temporarily stored in the RAM 33.

After the reading of the original starts, in S103, it is determined whether any error has occurred during the reading operation. For example, if the ADF 20 rotates during the reading operation, the main body unit 10 may vibrate such that the image is disturbed. Therefore, if the opening/closing sensor 45 senses the rotation of the ADF 20 (specifically, whether the amount of rotation of the ADF 20 per unit time is a predetermined value or more), it is determined that an error has occurred. Also, for example, if the vibration sensor 46 senses the vibration of the main body unit 10 of the image reading unit 2, it may be determined that an error has occurred.

If it is determined that an error has occurred (YES in S103), the reading operation stops and the process proceeds to S121. S121 will be described later. Even after it is determined that an error has occurred, the image sensor 15 continues to move downward in the sub-scan direction, up to a standby position 94 which is downstream of a downstream edge 93 of the original 9 in sub-scan direction (see FIG. 6).

If the reading is completed without any error (NO in S103), in S104, the read image data is analyzed, and is divided into a left page and a right page. The position where the two-page spread original is set on the FB glass 11 is determined in advance according the original size. Therefore, the MFP 100 can grasp the center position of the image data in the sub-scan direction, according to the original size. In S104, based on the center position, the read image data is divided. Alternatively, the image data of the original may be divided into two equal parts, that is, a left part and a right part.

Also, the boundary between the left page and the right page may be automatically recognized from the read image data, and the image data may be divided by the boundary. For example, in a case of reading a two-page spread original, in the image data of the two-page spread original, there is a black area (corresponding to binding portion) passing through the center of the image data of the two-page spread original. Therefore, the MFP 100 stores the black area as a mark image in the ROM 32 or the like, in advance, and detects the mark image from the image data of the original. It is noted that the mark image stored in the ROM 32 may be a partition line to be printed on a sheet. If the mark image is detected, it is possible to specify the position of the mark image and divide the image data into the image data of the left page and the image data of the right page by using the mark image as the boundary.

Figure 7:
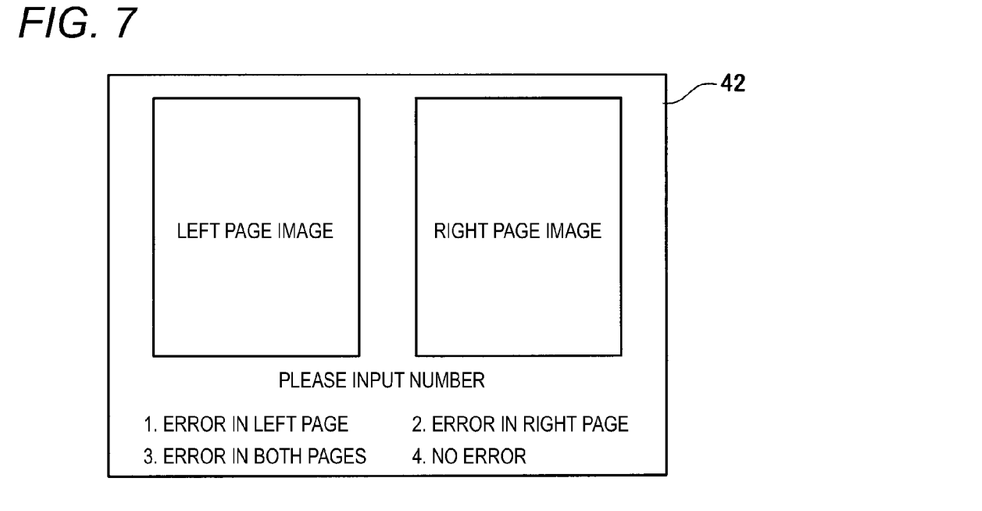
FIG. 7 is a view illustrating a display example of image data of two pages according to the first illustrative embodiment.

Next, in S105, the image data of the left page and the image data of the right page are displayed on the display unit 42. Further, as shown in FIG. 7, the user is asked whether there occurs any error in the images via that display screen. Specifically, there are four alternatives 'ERROR IN LEFT PAGE', 'ERROR IN RIGHT PAGE', 'ERROR IN BOTH PAGES', and 'NO ERROR' in S105, and a selection of one of the alternatives is received.

Then, in S106, it is determined whether an input indicating that there is an error in the read image data is received. In other words, it is determined whether an alternative other than 'NO ERROR' is selected. If there is an error in the read image data (YES in S106), the process proceeds to the S121.

In S121, it is determined whether only one of the two pages is successful. For example, in the case where it is determined in S103 that there is an error in the read image data, if the error occurrence position is downstream of the center position of the original in the sub-scan direction, in S121, it can be determined that the reading of an upstream page (page read earlier) is normally completed without an error, and abnormality occurs in the reading of a downstream page (page read later). In this case, it can be determined that only one page is successful. Meanwhile, if the error occurrence position is upstream of the center position in the sub-scan direction, it can be determined that abnormality occurs in the reading of the upstream page, and the reading of the downstream page is not performed. That is, it can be determined that both pages are failure. In a case where it is determined in S106 that there is an error in the image data, the determination in S121 can depend on the selected content. In other words, if 'ERROR IN LEFT PAGE' or 'ERROR IN RIGHT PAGE' is selected, it can be determined that only one page is successful. Meanwhile, if 'ERROR IN BOTH PAGES' is selected, it can be determined that both pages have failure.

If both pages have failure (NO in S121), since reading is not completed even on any one of the areas of the original, the process proceeds to S102. In other words, the image sensor 15 returns to the original position 90, and reading is performed again from start.

If only one page is successful (YES in S121), in S122, the image sensor 15 is not returned to the original position 90 but is moved to a position which is downstream of the downstream edge of the area, corresponding to the page on which the reading has failed, in the sub-scan direction. For example, if abnormality occurs in reading of a page 9L (page which is read earlier) located upstream in the sub-scan direction as shown in FIG. 6, the image sensor 15 returns up to a position 96 which is downstream of a downstream edge 92 of the page 9L in the sub-scan direction. Meanwhile, if abnormality occurs in reading of a page 9R (page which is read later) located downstream in the sub-scan direction, since the image sensor 15 is standing by at the standby position 94 which is downstream of the downstream edge 93 of the page 9R in sub-scan direction after the reading of the original 9, the image sensor 15 stands by at the standby position 94.

Next, in S123, the image sensor 15 is moved from the downstream side to the upstream side in the sub-scan direction, so as to read again the page on which the reading has failed. That is, the image sensor 15 reads the image of the page on which the reading has failed while moving reversely.

Figure 8:
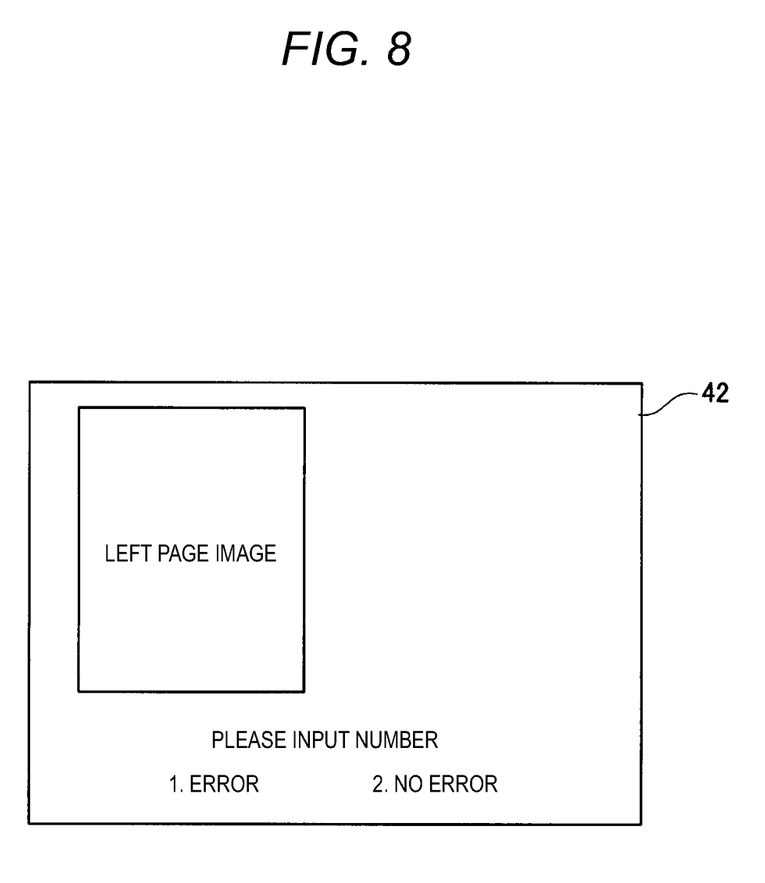
FIG. 8 is a view illustrating a display example of image data of one page according to the first illustrative embodiment.

After the reading is performed again in S123, in S124, the image data of the read page is displayed on the display unit 42. Further, in that display screen, the user is asked whether there is any error in the images, as shown in FIG. 8.

Then, in S125, it is determined whether an input indicating that there is an error in the read image data is received. If there is an error in the read image (YES in S125), the process proceeds to S122 where the corresponding page is read again. If the reading is successful (NO in S125), the process proceeds to S107.

If the reading on both pages is successful (NO in S106 or NO in S125), in S107, the image data of each page is registered in the file generated in S101. The registration order depends on the setting on whether the original is a left-opening type or a right-opening type. After the registration, the registered image data is erased from the memory.

After the image data is registered in the file in S107, it is determined whether there is the next original in S108. Existence or non-existence of the next original is determined by inquiring to the user. If a start button is pushed within a predetermined time period such that reading of the next original is instructed, it may be determined that there is the next page.

If there is the next original (YES in S108), that is, in a case of continuing to read a two-page spread original, the image sensor 15 returns to the original position 90, and the process proceeds to S102 where the next original is read. Meanwhile, if there is no next original (NO in S108), the book scanning process ends.

As described above, in the book scanning process of the first illustrative embodiment, when an image of one page of a two-page spread original is defective, the page having such defective image is read again. That is, one page is read a plurality of times. Then, if any error is not found in the re-read image data, the image data is selected. Meanwhile, the other page in which any error is not found is not read again. Therefore, the efficiency of reading is high, as compared to a configuration where the entire area of an original is read a plurality of times. Particularly, the time taken to perform reading a plurality of times is short, and a load on the memory which stores the read image data is small.

Further, in the first illustrative embodiment, after reading is completed without any error, in S105, image display is performed, and in S106, confirmation of the user on the contents of the image data is performed. However, the process may proceed to S107 without performing S105 and S106, and divided image data may be registered in the file in S107.

Also, in the first illustrative embodiment, the image sensor 15 can read an original while reversely moving. If reading cannot be performed while reversely moving the image sensor 15, in S122, the image sensor 15 is moved to the upstream side of the upstream edge of the area on which reading has failed, in the sub-scan direction. In other words, if reading the later read page 9R again, the image sensor 15 returns to the position 95 which is upstream of the upstream edge 92 of the page 9R (see FIG. 6). Meanwhile, if reading the earlier read page 9L again, the image sensor 15 returns to the original position 90. Then, the image sensor 15 reads the image of the failed page while moving from the upstream side to the downstream side in the sub-scan direction.

Second Illustrative Embodiment

Figure 9:
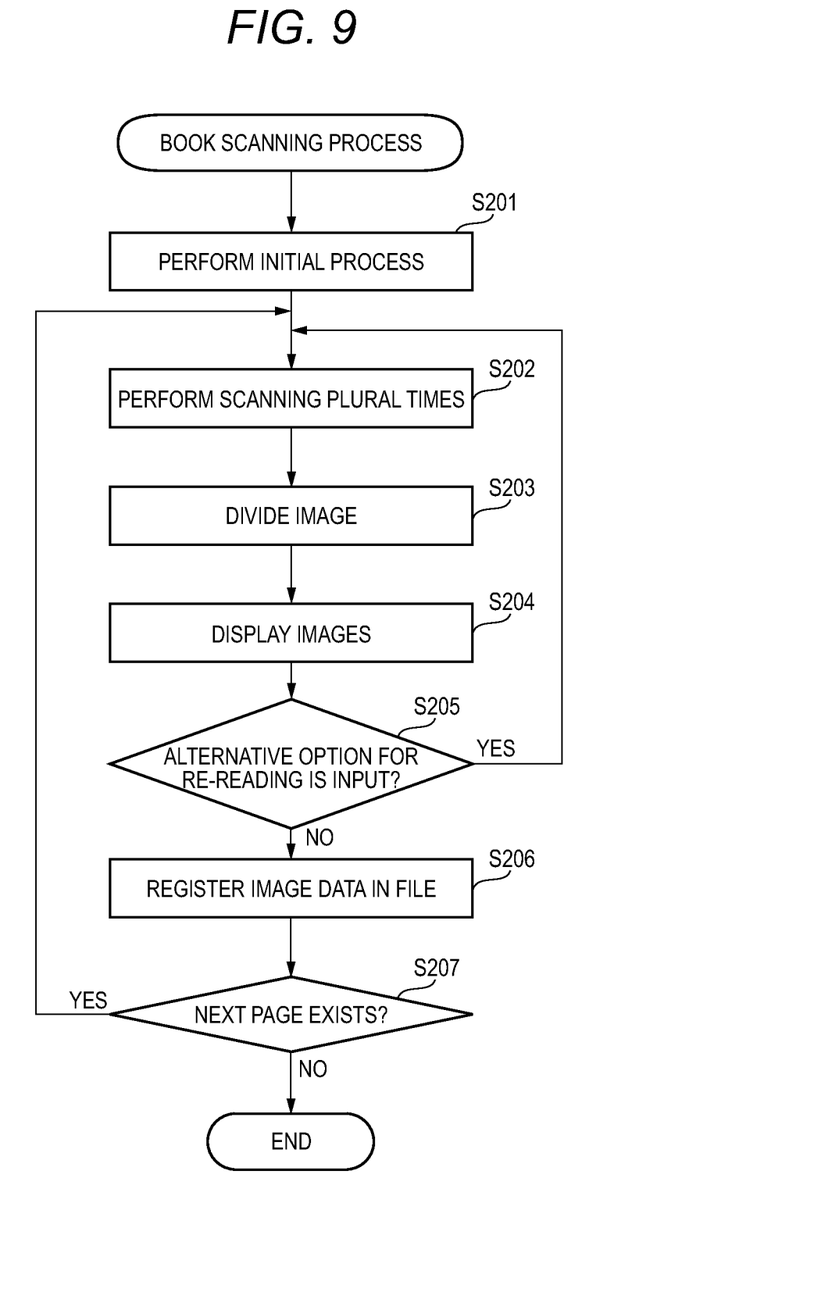
FIG. 9 is a flow chart illustrating a procedure of a book scanning process according to a second illustrative embodiment.

Next, the book scanning process of a second illustrative embodiment will be described with reference to the flow chart of FIG. 9. In the book scanning process of the second illustrative embodiment, the number of times of reading is set in advance, and reading is performed a plurality of times. The second illustrative embodiment is different from the first illustrative embodiment where an error of reading is determined and a page determined as an error is read a plurality of times.

Even in the book scanning process of the second illustrative embodiment, first, an initial process is performed in S201. In this initial process, settings such as a setting on the number of times of original reading, and a setting on whether a two-page spread original which is a read target is a right-opening type or a left-opening type. In the initial process, an initial file which has no data registered is generated. Further, in S201, the image sensor 15 is moved to the original position 90. In the setting on the number of times of original reading, the number of times of reading may be set for each page. For example, only for pages that are likely to cause image defects, a plurality of times of reading may be set.

Next, in S202, the image reading unit 2 reads a two-page spread original set on the FB glass 11 by the number of times of reading acquired in S201. Then, in S203, each of the read image data is divided into a left page and a right page.

Figure 10:
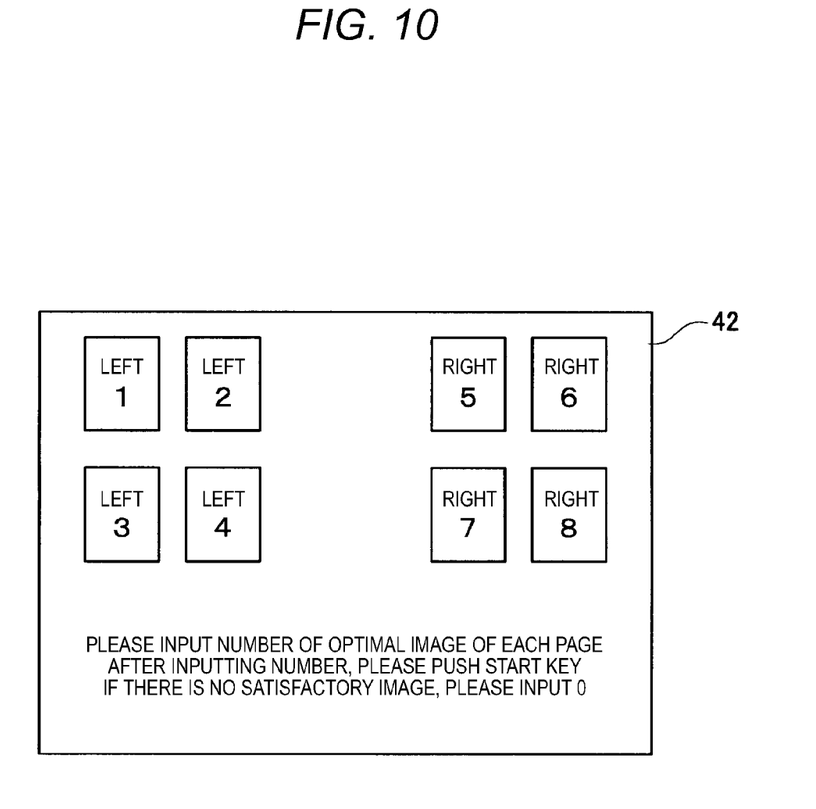
FIG. 10 is a view illustrating a display example of image data according to the second illustrative embodiment.

After reading in S203 is completed, in S204, as shown in FIG. 10, the plural read image data are displayed as a list on the display unit 42. Further, in that display screen, the user is asked about the best image for each page. Furthermore, considering a case where there is no satisfactory image, an alternative option for re-reading of the original (input of '0' in FIG. 10) is provided.

Next, in S205, it is determined whether the alternative option for re-reading of the original is selected. If the alternative option for re-reading of the original is selected (YES in S205), all of the image data read in S202 are erased from the memory, and the process proceeds to S202 where reading of the original is performed again.

Meanwhile, if the alternative option for re-reading of the original is not selected, that is, in a case where images for both pages are selected (NO in S205), in S206, the selected image data for the individual pages is registered in the file generated in S201. After the registration, the registered image data and the unselected image data are erased from the memory.

After the image data is registered in the file in S206, in S207, it is determined whether there is the next original. If there is the next original (YES in S207), that is, in a case of continuing to read a two-page spread original, the image sensor 15 returns to the original position 90, and the process proceeds to S202 where the next original is read. Alternatively, the process may proceed to S201 where the setting on the number of times of reading is reset. Meanwhile, if there is no next original (NO in S207), the book scanning process ends.

In a case where there is a defect in an image of any one page of a two-page spread original, if the original is read again like the related-art technique, even when there is no error in the reading of the other page, the image data of the other page is not used. In other words, in order to acquire satisfactory image data of a two-page spread original, there should be no image defect in the read image data of both pages (there should be no image defect in the entire area of the original). Therefore, the number of times of reading for acquiring image data of a two-page spread original may increase.

In the book scanning process of the second illustrative embodiment, at least one page of a two-page spread original is read a plurality of times. Then, an optimal image data for each page is selected from the plural read image data, and is registered in the file. In other words, it is possible to use a portion, including no image defect portion, of the plural image data of the two-page spread original. Therefore, the efficiency of reading is high, as compared to a configuration where an optimal image data is selected from plural image data read from the entire area of the original.

While the present invention has been shown and described with reference to certain illustrative embodiments thereof, it will be understood by those skilled in the art that various changes in form and details may be made therein without departing from the spirit and scope of the invention as defined by the appended claims.

For example, the present invention is not limited to the MFP, but is applicable to any apparatuses having an image reading function, such as a copy machine, a scanner, and a FAX. Further, the inventive concept of the present invention is also applicable to dedicated scanners for reading books.

In the illustrative embodiments, the MFP 100 (image reading apparatus) selects image data and generates a file. However, an apparatus other than the MFP 100 may select image data and generate a file. For example, in a case of a system having a scanner and a PC, the scanner may read a two-page spread original, and the PC may select image data, generate a file, and register the image data.

In the illustrative embodiments, before existence or non-existence of the next original is confirmed, the image data of the previous original is registered in the file, and the image data of the previous original is erased from the memory. However, the image data may be registered in the file after reading of all originals is completed, that is, after it is determined that there is no next original. In this case, until the reading on all of the originals is completed, the image data of each original to be registered is stored in the memory, and after it is determined that there is no next original, the image data of all of the originals are registered in the file, and the read image data is erased from the memory, sequentially from the registered image data.

In the illustrative embodiments, the image data of the two-page spread original is registered as two image data, that is, the image data of the left page and the image data of the right page, in the file. However, the image data may be registered as one image data having the layout before the division into the image data of the left page and the image data of the right page (that is, image data maintaining the layout of the individual pages of the two-page spread original).

Further, in the illustrative embodiments, a two-page spread original which is an original in a two-page spread state is a read target, at least one page is read a plurality of times, and one image data of the plural read image data is registered in the file. However, the read target is not limited to the two-page spread original. For example, even in a case of an original other than a two-page spread original, if it is possible to designate a specific area of the original, the designated area may be read a plurality of times. Also, if it is possible to register a specific image in the MFP 100 in advance, after all originals is read, the image data may be analyzed, and if there is any specific image registered in the MFP 100, an area including the specific image may be read a plurality of times.

In the illustrative embodiments, one CPU 31 performs the various process. However, the present invention is not limited thereto. For example, a plurality of CPUs or dedicated circuit ASIC (Application Specific Integrated Circuit) may execute those process.

What is claimed is:

1. An image reading system comprising:
a reading unit configured to read a still original while moving in a read direction with respect to the original from an initial position to a standby position, wherein the original includes a first area and a second area which is arranged at a downstream side of the first area in the read direction;
a controller configured to:
control the reading unit to read the original while moving from the initial position arranged upstream of an upstream edge portion of the first area to the standby position arranged downstream of a downstream edge of the second area in the read direction;
determine whether an error occurs during reading of the first area and the second area;
if it is determined that an error occurs during reading of both the first area and the second area, control the reading unit to return to the initial position from the standby position and re-read the original while moving from the initial position to the standby position in the read direction, and generate a file storing a first image data which is acquired by re-reading of the first area and a second image data which is acquired by re-reading of the second area;
if it is determined that an error occurs during reading of the first area and that an error does not occur during reading of the second area, control the reading unit to move from the standby position to the downstream edge portion of the first area in the read direction and re-read the first area while moving from the downstream edge portion of the first area to an upstream edge portion of the first area, and generate a file storing a first image data which is acquired by re-reading of the first area and a second image data which is acquired by first reading of the second area;
if it is determined that an error does not occur during reading of the first area and that an error occurs during reading of the second area, control the reading unit to re-read the second area while moving from the standby position to an upstream edge portion of the second area, and generate a file storing a first image data which is acquired by first reading of the first area and a second image data which is acquired by re-reading of the second area; and if it is determined that an error does not occur during reading of both the first area and the second area, control the reading unit to return to the initial position, and generate a file storing a first image data which is acquired by first reading of the first area and a second image data which is acquired by first reading of the second area.

2. The image reading system according to claim 1, wherein the reading unit includes:
   a placing table configured to place thereon the original;
   a cover configured to cover the placing table; and
   an opening/closing sensor configured to sense movement of the cover, and
wherein the controller is configured to determine that an error occurs when the opening/closing sensor senses the movement of the cover.

3. The image reading system according to claim 1, further comprising:
   a vibration sensor configured to sense vibration of the reading unit,
wherein the controller is configured to determine that an error occurs when the vibration sensor senses the vibration.

* * * * *